United States Patent [19]

Padgitt et al.

[11] 3,842,345
[45] Oct. 15, 1974

[54] METHOD AND APPARATUS FOR OBTAINING ACCURATE READOUT OF BREATH TESTERS

[75] Inventors: Kenneth W. Padgitt, Arlington Heights; Donald H. Ward, Glen Ellyn, both of Ill.

[73] Assignee: Borg-Warner Corporation, Chicago, Ill.

[22] Filed: Nov. 10, 1971

[21] Appl. No.: 197,407

[52] U.S. Cl. ............. 324/71 R, 23/232 E, 128/2 C, 324/103
[51] Int. Cl. ........................ G01n 27/00, A61b 5/00
[58] Field of Search ....... 324/71, 33, 103; 73/421.5; 23/232 E, 254 E, 255 E; 128/2 C; 204/195 R

[56] References Cited
UNITED STATES PATENTS

| | | | |
|---|---|---|---|
| 3,521,045 | 7/1970 | Murphy | 324/71 R |
| 3,710,249 | 1/1973 | Kadar | 324/103 |
| 3,726,270 | 4/1973 | Griffis | 73/421.5 R |

OTHER PUBLICATIONS
Lovell, W.S., "Breath Test for Determining Alcohol in the Blood," Science, Vol. 178, October 1972, pp. 264–272.

*Primary Examiner*—Alfred E. Smith
*Assistant Examiner*—Rolf Hille
*Attorney, Agent, or Firm*—James J. Jennings, Jr.

[57] ABSTRACT

An improved readout apparatus and method for use with a testing system such as that shown in U.S. Pat. application Ser. No. 136,778, now Pat. No. 3,764,270 is disclosed employing a holding amplifier, null detector and a potentiometer coupled to a turns counter. The output of an alcohol breath testing detector system is held in the holding amplifier (voltage follower) and compared with the voltage from the potentiometer by the null detector. When nulled, the reading of the turns counter gives an extremely accurate reading of breath alcohol level. For evidential purposes, the null detector and turns counter may be photographed.

7 Claims, 2 Drawing Figures

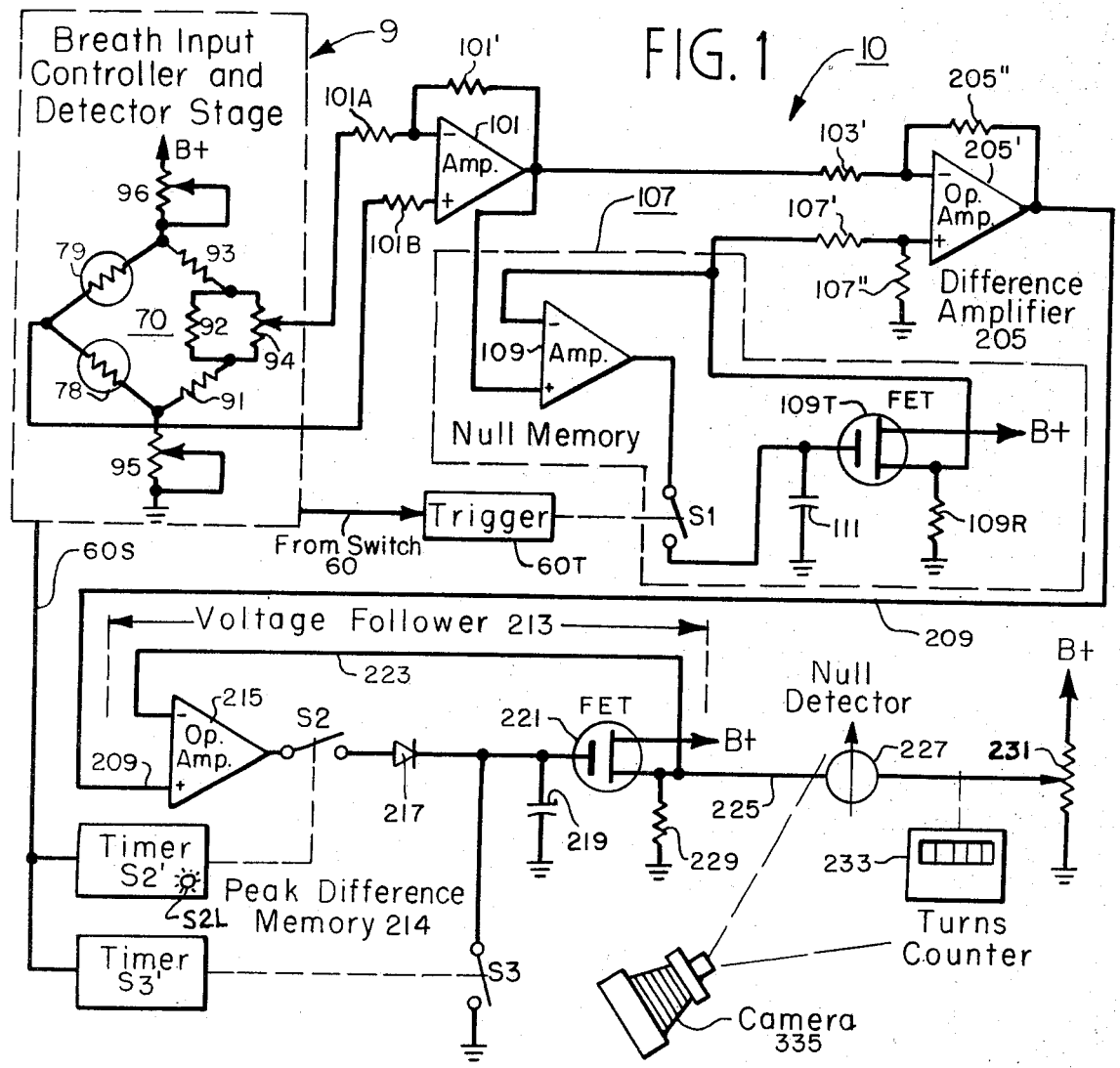
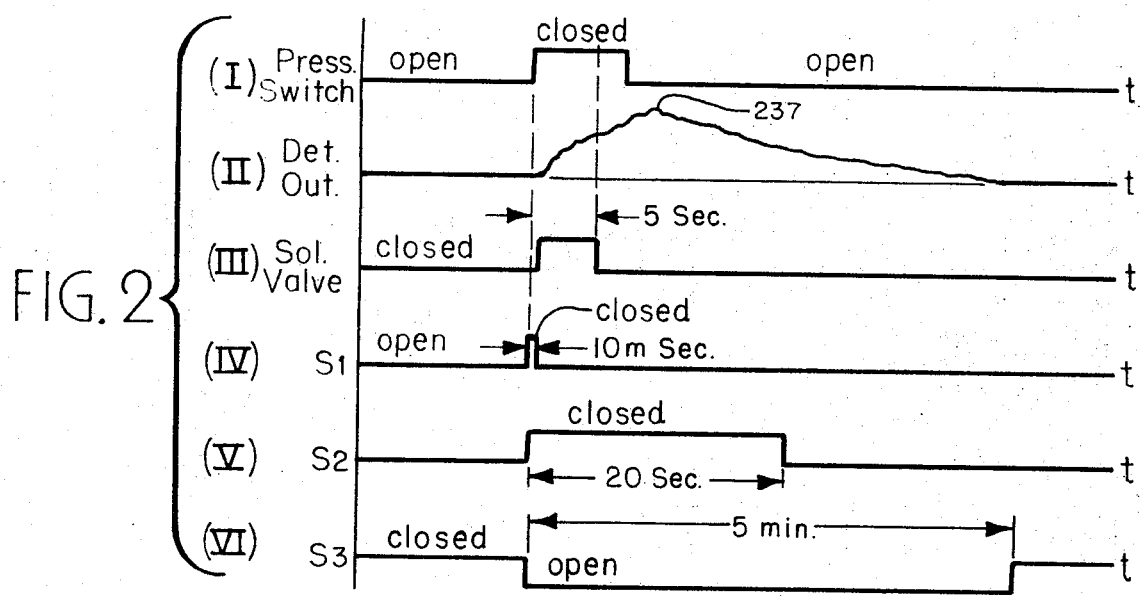

3,842,345

METHOD AND APPARATUS FOR OBTAINING ACCURATE READOUT OF BREATH TESTERS

BACKGROUND OF THE INVENTION

The present invention is directed to an improvement in alcohol breath testing of the type disclosed in U.S. Pat. application Ser. No. 136,778 entitled "Breath Testing System" which application was filed on Mar. 23, 1971 in the names of D. Collier, J. Hoppesch and A. Mamo and is assigned to the same assignee, Borg-Warner Corporation, as is the present invention. The application issued as U.S. Pat. No. 3,764,270 on Oct. 9, 1973.

The general background of this invention may be understood by referring to the above mentioned patent. The present improvement is particularly concerned with the problem of providing a high degree of accuracy in the readout of such testers. The object is to achieve such reliability and accuracy that would recommend testers employing the invention to law enforcement agencies and make the test results readily admissable in evidence by the courts.

In a breath analyzer for use by police, it is necessary that a permanent record of the test be available. One problem with a catalytic detector and some other detectors is that their output is a continuously varying function of time, with the peak amplitude corresponding to "equivalent blood alcohol" or E.B.A. This peak signal amplitude exists only for a few seconds, then rapidly decays. The output may be measured and recorded continuously as by a strip chart recorder in order to get the required accuracy, but the recorder mechanism would be costly. Another approach would be an analog-to-digital converter plus a digital memory, but this is also expensive.

SUMMARY OF THE INVENTION

To overcome the above problems and to provide a breath tester that may be produced economically and yet give an accurate readout related to such "E.B.A." in these circumstances, an improved breath tester, in accordance with the present invention, provides for means (such as a peak detector amplifier) for detecting and producing a peak signal coupled to receive the detector output, selectively variable signal means (e.g., a potentiometer for producing an adjustable tap voltage), readout means (such as a turns counter or the like) coupled to the variable signal means for indicating the output thereof, and an indicator (e.g., a balance or null meter), coupled between the variable signal means and the peak signal holding means, for producing an indication when the signals reach a predetermined relationship to each other whereby an accurate readout can be obtained from the output.

The features of the present invention which are believed to be novel are set forth with particularity in the appended claims. The invention, together with the further advantages thereof, may best be understood by reference to the following description taken in connection with the accompanying drawing, in the several figures of which like reference numerals identify like elements.

BRIEF DESCRIPTION OF THE DRAWING

FIG. 1 is a schematic, partly in block and partly in circuit diagram form, of a breath tester and readout constructed in accordance with the principles of the present invention; and FIG. 2 is a set of graphs (I)-(VI) on the same time base representing the state of various components, which graphs are useful in understanding the operation of the improved tester of FIG. 1 and its operation in conformity with the inventive method.

DETAILED DESCRIPTION

Referring to FIG. 1 hereof there is depicted an improved tester, generally designated by the number 10, constructed in accordance with the principles of the present invention. The tester 10 includes a breath input controller and detector stage which itself is generally designated by the numeral 9. The stage 9 is identical (except as hereinafter noted) to that disclosed in FIG. 1-4 and the detailed description thereof of the aforementioned Collier et al. patent, which portion thereof, is, for brevity, incorporated by reference under the practice summarized in the announcement of the Commissioner of Patents, printed on Jan. 18, 1969 in 34 Federal Register 833 (859 Official Gazette 346).

The stage 9 includes a detector 70, which includes a bridge circuit with a catalytic resistance element 78 and a non-catalytic but otherwise identical resistive element 79 as two of the legs thereof.

Opposite elements 78, 79 are two additional elements 93, 91 shown as simple resistances. A resistor 92 is coupled between the resistors 91 and 93, and a potentiometer 94 is connected across resistor 92. The bridge is energized from a well regulated voltage supply through the terminal designated B+ over adjustable resistor 96 to the common connection between elements 79, 93. The energizing circuit is completed from the common connection between elements 78 and 91, over the effective portion of adjustable resistor 95, to ground. After energization, the position of the movable arm of potentiometer 94 may be adjusted (normally at the factory) such that initially there is no net voltage, or no information signal, between the output conductors of the bridge.

The output of the detector 70 is fed from the tap of potentiometer 94 and from the junction of elements 78, 79 through, respectively, resistors 101A and 101B to the negative and to the positive primary inputs of an operational amplifier (Op Amp) 101 connected to amplify any difference in potential between its inputs. A feedback resistor 101' is connected between the output of 101 and the negative input. The output of amplifier 101 is coupled through a resistor 103' to one input of a difference amplifier 205, which input is the negative primary input of an Op Amp 205'. A feedback resistor 205'' is connected between the output of the Op Amp 205' and its negative input. The positive input to this Op Amp is taken from a voltage dividing resistance circuit including series connected resistors 107' and 107''. The other end of resistor 107' is connected to a reference or null memory voltage source 107. The other end of the resistor 107'' is connected to a source of fixed potential here taken as ground.

The source 107 is a memory circuit and is also connectible to the output of the detector amplifier 101 through an amplifier 109 and switch S1 and includes a holding capacitor 111 connected from one side of switch S1 to ground. The capacitor 111 is also connected to the gate of an insulated gate Field Effect Transistor (FET) 109T whose drain is connected to B+ and whose source is connected through a resistor 109R to ground and also through the resistor 107' to the plus input of the Op Amp 205'. The circuit 107 serves as a holding amplifier for the voltage stored across the capacitor 111, which stored voltage is derived from the output of the amplifier 101 when the switch S1 is closed. The switch S1 corresponds to the switch K3A of the previously cited and incorporated Collier, et al patent, but in this case rather than being operated in response to a warm-up timer it is instead coupled to and operated momentarily in response to the first closure of the pressure switch 60 of the stage 9. To this end the switch 60 is coupled to the switch S1 through a trigger circuit 60T which may be, for example, the same as the circuit (including components there designated K3, 150, etc.) shown in FIG. 5 of the aforementioned Collier et al patent for energizing the switch K3A of that patent.

The difference amplifier 205 feeds its output over a line 209 to a voltage follower circuit 213 which includes a peak difference memory circuit 214. The circuit 214 includes an Op Amp 215 whose primary positive input is connected to the line 209 and whose output is connected through a switch S2 to the anode of a diode 217 whose cathode is connected through a parallel combination of a switch S3 and a second holding capacitor 219 to ground and also to the gate of another insulated gate Field Effect Transistor 221. The FET 221 has its drain connected to the source of well regulated voltage B+ and its source connected via a feedback line 223 to the negative primary input of the Op Amp 215, via line 225 to a null detector 227 and also through a resistor 229 to ground. The switches S2 and S3 are operated by timers S2' and S3' (which may be a single timer having different outputs of the type explained below) which are in turn controlled by a start input 60S from the stage 9.

The null indicator 227 is preferably a galvanometer or microammeter and has its other input taken from the tap on a potentiometer 331 connected between B+ and ground. The potentiometer 331 includes a means for indicating its signal output, a turns counter 233 preferably having its display in terms of blood alcohol equivalence.

Means for recording the turns counter output are provided which, in this case, is a camera 335, although other means, such as imprinting the turns counter may be employed without departing from at least the broader aspects of the present invention.

OPERATION

The sequence of operation of the tester 10 may best be explained with the aid of the graphs of FIG. 2. As is explained more fully in the above mentioned U.S. patent, when the subject taking the test blows into the breath input unit of the stage 9 it closes a pressure switch in the controller portion thereof. The state of this switch and its output voltage is indicated in Graph I. The subject must maintain this switch closed for at least a minimum preselected period, of, e.g., 5 seconds, to ensure that a deep lung breath sample is taken. At the end of that period, if this has occurred he can cease blowing. The continued closure of this pressure switch for a predetermined period of, e.g., 5 seconds causes (with a timer) a solenoid air flow governing valve to be opened for that period and then closed as indicated in Graph III of FIG. 2. (The solenoid valve responds to the pressure switch somewhat slowly.) During this time, breath is fed to the detector's elements 78, 79 and the output voltage of the bridge circuit may in a particular case be as shown in Graph II. In that Graph, the voltage drops slightly because of a cooling effect of the air flow and then rises because of alcohol content. The breath fed to the detector chamber at the end of this period, five seconds, is deep lung breath from which the blood alcohol content of the subject may be inferred with the greatest accuracy. At the end of this period the valve closes again and the output of the detector is allowed to reach a maximum indicated at 237 from which it decays over a longer period (several minutes) as the gaseous alcohol is vented and burned by the catalytic element 78.

The output of the reference source 107 is generated by the momentary operation of the switch S1 at the start of the test procedure as indicated in Graph IV. (And before the output of the detector begins changing in the just described manner.) When this occurs this output is stored on the capacitor 111 and is thereafter amplified and fed to the difference amplifier 205.

As indicated in Graph V, the switch S2 is normally open but is closed during the period when the detector output (normalized or nulled by reference source 107 and amplified by the difference amplifier 205) is fed over the line 209. This allows this output to be fed through the amplifier 215 and through the diode 217.

At the same time that the switch S2 is closed the switch S3 is opened as indicated in Graph VI of FIG. 2. With the opening of the switch S3, the output of the Op Amp 215 is fed directly to the capacitor 219 through the diode 217 and stored there. (The resistance through the gate circuit of the FET 221 is so large that for all practical purposes this alternative current path can be ignored.) The diode 217 serves to effectively prevent current from flowing from the capacitor 219 during the short period S2 is closed and thus the peak voltage is stored on capacitor 219.

After the closing of the solenoid valve (Graph III) the switch S2 remains closed for a period long enough to ensure that the output of the detector 70 has reached its maximum (e.g., for approximately 15 seconds or a total of approximately 20 seconds in all). At the end of this period the switch is opened to prevent back leakage of current from the capacitor 219 through the diode 217. (All presently known, practical solid state diodes have a small leakage current.)

The switch S3, however, as shown in Graph VI remains open for an extended period of time (e.g., 5 minutes) to allow for the adjustment of the null detector 227 and the operation of the recording means and for the detector output to return to a normal level. At the end of this extended period the switch S3 closes discharging the capacitor 219.

At this point in time, the system has returned to its starting state and another test may be undertaken. Summarizing the operation:

A. When the subject blows into the breath tube, a pressure switch in the regulator causes S1 to momentarily close, S2 to close and S3 to open. S1 causes capacitor 111 to store the bridge output. After S1 releases, a solenoid valve allows the breath to enter the detector.

B. The difference amplifier 205 begins to generate the difference, if any, between the stored bridge output and the "real-time" output.

C. The peak difference memory 214 causes the voltage on capacitor 219 to rise to a value corresponding to the peak difference since the diode prevents capacitor 219 from discharging into the output of the operational amplifier. The feedback loop 223 around the peak difference memory causes the memory to act as a voltage follower and eliminates any effects due to voltage drops in either the diode or the FET source follower.

D. After the subject finishes blowing and the delay timer S2' has run out, a light (or the like), comes on to signal the user to null the galvanometer by adjusting the potentiometer.

This may be done at leisure since the peak difference has been stored and will not decay for several minutes. After adjusting the null, the user, such as a Police officer then causes the permanent record to be made, either by photographing it using 335 or by imprinting the turns counter, or using whatever other means may be incorporated.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true scope of the invention as measured by the prior art. These claims should be interpreted as broadly as the prior art allows.

What is claimed is:

1. In a breath tester of the type that includes a detector which produces time varying d.c. output electrical signals having a peak amplitude representative of gaseous content, which signals vary during a period of detecting, the improvement comprising:
   memory means for producing and holding a peak signal, coupled to the output of said detector and responsive to the detector's peak output signal;
   variable signal means (331) for producing selectively variable output signals;
   readout means (233) coupled to the variable signal means for giving a readout proportional to the signal output of said variable signal means; and
   an indicator (227) coupled to receive and compare the output signals of said memory means and said variable signal means for indicating when those signals reach a predetermined relationship;
   whereby said variable signal means may be adjusted to reach said predetermined relationship and an accurate readout of the detected gaseous content may be obtained and stored on said readout means.

2. The breath tester of claim 1, wherein:
   said memory means produces a first d.c. potential;
   said variable signal means is a potentiometer that produces a second d.c. potential; and
   said indicator is a null detector.

3. The breath tester of claim 2, wherein:
   said memory means includes a capacitor for holding the peak output voltage and a high input impedance amplifier coupled to said capacitor for producing the memory output.

4. The method of obtaining an accurate inebriate breath testing system of the type employing an equivalent blood alcohol (EBA) detector from which a time varying d.c. electrical output signal is produced, which signal's peak value is a function of EBA, using a peak signal memory, a selectively variable signal source, and means for indicating the output of the variable signal source, comprising the steps of:
   a. coupling the detector's output signal to the peak signal memory for a given time period, and
   b. thereafter, adjusting the potential provided by the variable signal source to achieve a predetermined relationship relative to the output of the peak signal memory;
   so that the output indicating means will indicate the blood alcohol level.

5. The method of claim 4, wherein:
   after said step (b),
   c. recording the output indicating means indication.

6. The method of obtaining an accurate record of a subject's breath in terms of alcohol blood equivalents, employing a time varying d.c. output detector whose peak output is indicative thereof, a d.c. peak signal holding and reproducing memory circuits, a potentiometer coupled to a fixed voltage source, a turns counter calibrated in alcohol blood equivalent units coupled to the potentiometer for giving an indication of its tap's setting, and a null indicator, comprising the steps of:
   a. causing the subject's breath to enter the detector;
   b. coupling the detector's output to the peak memory circuit for a selected period;
   c. after that period, coupling the memory circuit's output and the potentiometer's output to the null indicator;
   d. changing the potentiometer output until the null indicator indicates that it is equal to the memory circuit's output; and
   e. recording the turns counter's indication.

7. The method of claim 6, wherein:
   said recording step is performed by photographing both the null indicator and the turns counter.

* * * * *